Dec. 15, 1964   H. BALLUFF   3,161,377
APPARATUS FOR CONTROLLING AIRCRAFT
Filed Oct. 2, 1963   2 Sheets-Sheet 1
Fig. 2
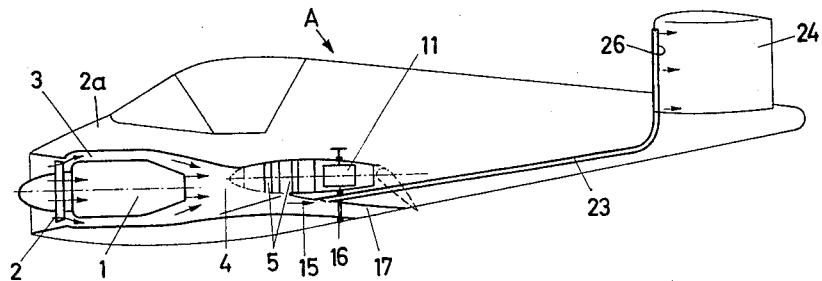
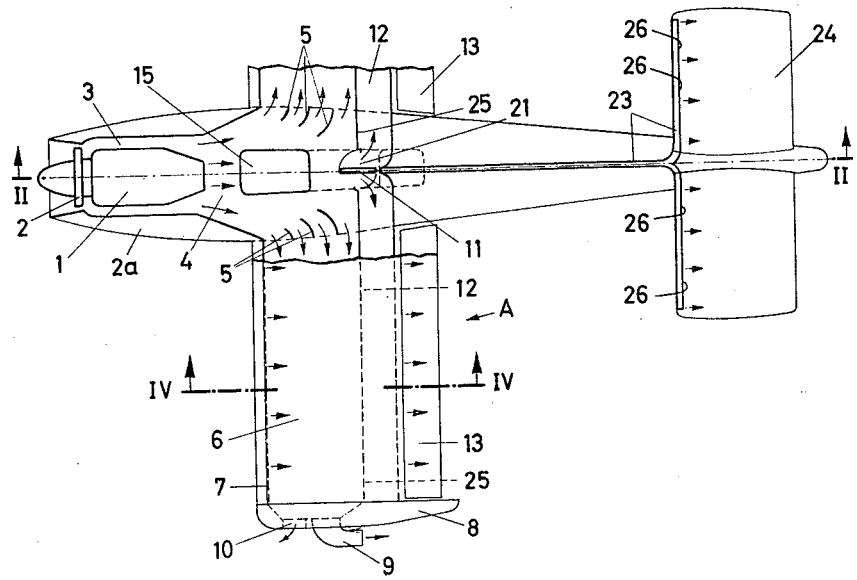
Fig. 1
INVENTOR:
Helmut Balluff INVENTOR:
Helmut Balluff United States Patent Office 3,161,377
Patented Dec. 15, 1964

3,161,377
APPARATUS FOR CONTROLLING AIRCRAFT
Helmut Balluff, Donauworth, Germany, assignor to Siebelwerke-ATG G.m.b.H., Donauworth, Germany, a corporation of Germany
Filed Oct. 2, 1963, Ser. No. 313,393
Claims priority, application Germany, Nov. 9, 1962, S 82,393
17 Claims. (Cl. 244—52)

The present invention relates to an improved apparatus for controlling winged aircraft or other air carriers in accordance with the reaction principle by means of control nozzles disposed on the aircraft which are fed by the gas turbines thereof or by one or more special compressors according to my copending United States application, Serial No. 223,986, filed September 17, 1962, for "Method and Apparatus for Directional Control of Winged Aircraft."

In the apparatus disclosed in my aforesaid United States application, the control nozzles which carry out control of the aircraft according to the reaction principle constitute the sole control means for directionally controlling the aircraft about its three axes, and are installed for controlling or deflecting the jet streams or propulsive jets emerging from them.

A primary object of the present invention is to effect a further development and improvement of the aforementioned apparatus, achieved in that the gas turbines or the compressor or comprosseors, respectively, for the control nozzles are simultaneously operatively connected with a device for influencing the boundary-layer through removal by suction or the exhaust of air at the lifting surfaces or wings or other surfaces of the aircraft. Accordingly, the subject application is to be considered a continuing application and, more specifically, a continuation-in-part of my previously mentioned copending United States application.

Another important object of this invention is the provision of apparatus for influencing the boundary layer of winged aircraft or other aircraft.

A further important object of the present invention is to provide an improved system for controlling winged aircraft or other aircraft according to the reaction principle including control nozzles disposed on the aircraft, such control nozzles providing the sole control means for the aircraft, means for supplying a gaseous medium to said control nozzles, and means operatively communicating with said supplying means for influencing the boundary-layer by discharging at least a portion of the gaseous medium at a lifting surface or other surface of the aircraft.

Apparatus for effecting boundary-layer influence are already known to the art in conjunction with rudder controlled winged aircraft. The influencing of the boundary-layer is above all necessary with short take-off or short-landing operations of the aircraft, also during flight conditions when the aircraft possesses a small speed. The present invention, however, provides the great advantage that the gas turbines or compressors, respectively, serving to control the aircraft according to the reaction principle, are simultaneously also employed for influencing the boundary-layer, so that for this boundary-layer influence it is not necessary to provide a special energy generator.

The apparatus for influencing the boundary-layer advantageously exhibits exhaust openings at the leading edges of the wings and in front of and/or above the landing flaps of the aircraft which communicate with the gas turbine or turbines or the compressor or compressors, respectively, for the jet control of the aircraft. The gas turbine or turbines or the compressors for the jet control can simultaneously also serve for the main jet propulsion of the aircraft, whereby it is advantageous that the exhaust openings for the boundary-layer influence and the opening of the thrust nozzle or thrust jet of the main jet propulsion are collectively or individually regulatable in their cross-section.

Advantageously the turbine or turbines or compressors for the control nozzles and for the boundary-layer influence are each equipped with a tap or by-pass channel means or line, respectively, so that only a portion of the air to be exhausted, serving for influencing the boundary-layer and for the control of the aircraft, passes through the turbine as combustion air. With the use of double-stream propulsion units the cold air delivered by the front fan or other expedient into the by-pass channel, upon subsequent commingling with the combustion air, is supplied to the exhaust openings and/or control nozzles, respectively. The mixing compartment or chamber provided behind the turbine, in which the combustion air emanating from the turbine is mixed with the cold air supplied by the front fan or compressor, cannot only be operably connected with the exhaust openings for influencing the boundary-layer, but rather, can also be connected with the thrust nozzle or nozzles, respectively, and the possibly provided or available brake nozzles of the aircraft.

Instead of a double-stream propulsion unit it is also possible to employ a turbo-prop having an erected impeller or fan-wheel blower in place of an erected propeller. Due to the application of mixed or secondary air for influencing the boundary-layer and for jet control, the air circulation channels or ducts serving to convey the mixed air from the power plant or propulsive unit to the exhaust openings and the control nozzles can be maintained smaller in cross-section with simultaneous reduction of the flow resistance, and indeed, for reasons of the considerably lower temperature of the mixed or secondary air in comparison with that of an unmixed thermal jet escaping from the jet propulsive unit.

Naturally, the cold air and the hot air could also be separately applied in that, for example, the cold air delivered by the front fan is employed only for influencing the boundary-layer and the hot air streaming out of the turbine is employed for jet control and, as the case may be, for the propulsive effort.

Still further objects and the entire scope of applicability of the present invention will become apparent from the detailed description given hereinafter; it should be understood, however, that the detailed description and specific examples, while indicating a preferred embodiment of the invention, are given by way of illustration only, since various changes and modifications within the spirit and scope of the invention will become apparent to those skilled in the art from this detailed description.

In the drawings:

FIGURE 1 diagrammatically illustrates a horizontal cross-section taken through an aircraft provided with the inventive apparatus for controlling and influencing of the boundary-layer;

FIGURE 2 is a longitudinal cross-sectional view of the aircraft of FIGURE 1, taken along lines II—II thereof;

Figure 3:
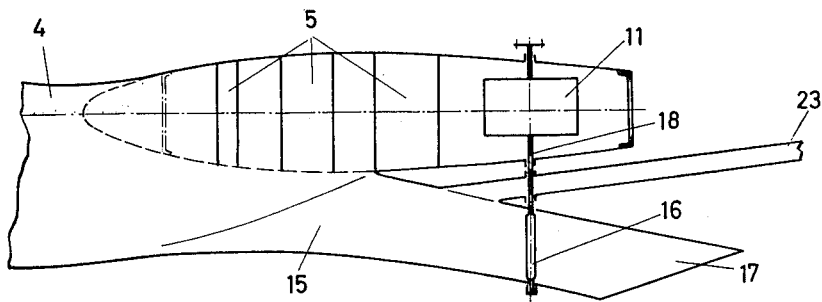
FIGURE 3 is an enlarged fragmentary, elevational, cross-sectional view taken through substantially the middle section of the aircraft in the region of the mixing chamber and the thrust nozzle.

Describing now the drawings, the double-stream propulsion or power unit arranged in the fuselage nose 2a of the aircraft A illustrated in the drawing, is here shown, by way of example, to comprise supply means for a gaseous medium, such as air, and incorporates at least one turbine 1 provided with a forwardly disposed front fan 2 and a by-pass channel 3. The air sucked-in by the front fan 2 is partially conducted through the turbine 1 of the power unit and partially through the by-pass channel means 3, whereupon the hot air emerging from the turbine 1 commingles with the cold air emerging from the by-pass channel 3 in the mixing compartment or chamber 4 to provide a mixed or secondary air, the temperature of which is considerably lower than that of the hot air emerging from the turbine 1. The gaseous medium could also be supplied from the compressor of the turbine 1 or from one or more specially provided compressors providing a supply source therefor.

Figure 4:
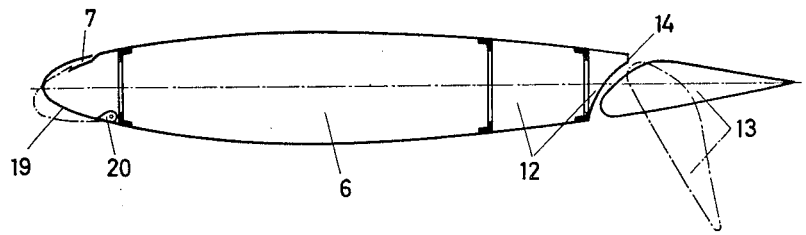
FIGURE 4 is a cross-sectional view through a lifting surface or wing of the aircraft depicted in FIGURE 1, and taken along lines IV—IV thereof.

The mixed or secondary air coming from the mixing compartment or chamber 4 flows in part, with the aid of the baffle or deflector plates 5, through the hollow constructed lifting surfaces or wings 6 to the exhaust or discharge slots 7 provided at the profile nose or streamlined sections as well as to the pivotable control nozzles 9 providing combined control and propulsive jets and brake nozzles 10 provided at the wing tips or ends 8. On the other hand, the other portion of the mixed air coming from the mixing chamber 4, with an open flap or closure means 11, flows via the opening 21 through the channel 12 provided in the rearward zone of each wing 6 to the exhaust or discharge slots 14 of the wings 6 which are located in front of the landing flaps 13. For the sake of simplicity in illustration and description of the invention only the details of one wing 6 of the aircraft have been shown in FIGURE 4, yet it will be appreciated that the other wing is similarly designed to the wing shown and described herein.

A further conduit or channel 15 leads from the mixing chamber 4 to at least one thrust nozzle 17 which can be closed through the agency of closure means or flap 16, said thrust nozzle being provided for the propulsion or forward thrust of the aircraft A. The two closure means or flaps 11 and 16 for sealing the channels 12 and 15, respectively, are advantageously disposed upon a common shaft 18 upon which they are mounted in such a manner that the flap 11 is located in its closing position when the flap 16 completely frees the thrust nozzle 17. With a closed flap 16 the entire mixed air coming from the mixing chamber 4 therefore flows through the exhaust slots 7 and 14 provided at the wings 6 as well as through the control nozzles 9 and, if desired, also through the braking nozzle 10. Conversely, if the flap 16 is located in its open position, then the major portion of the mixed air coming from the mixing chamber 4 flows through the thrust channel 15 to the thrust nozzle 17, whereas the remainder of the mixed air, in consequence of the obturated channels 12 and the simultaneously closed exhaust slots 7, escapes through the control nozzle 9 and with open brake nozzles 10 also through the latter.

The exhaust slots or openings 7 provided at the profile nose or streamlined sections of the wings 6 are formed by flap-like construction of these profile nose or streamlined sections. The exhaust slot or opening 7 is opened by downwardly pivoting the streamlined section or profile nose 19 about the pivot axis 20, as shown in phantom lines in FIGURE 4, and is again closed by upwardly pivoting such profile nose 19 back into its normal position. The upward and downward pivoting or rocking of the respective profile nose 19 can be simultaneously coupled together, in a suitable manner as with an appropriate linkage or lever system for example, with the movement of the flap 11 for the infeed of the mixed air to the exhaust openings or slots 14 disposed in front of the landing flaps 13, such that according to opening of the exhaust slots 7 and the openings 21 sealably by the flap 11 and arranged in the partition wall 25 of the wings 6 for the infeed of mixed air to the exhaust slots 14, a more or less large quantity of mixed air can be caused to emerge through the exhaust slots 7 and 14, respectively, and the regulation or influence of the boundary-layer can be carried out to a suitable or corresponding degree.

Upon discharge of the mixed air through the exhaust slots or openings 7 and 14, the boundary-layer above the wings 6 of the aircraft A is influenced in such a manner that the coefficient of lift increases and therewith the take-off or landing of the aircraft is enhanced such that, the aircraft with the speeds prevailing with such conditions of flight possesses or maintains the full lift or lifting power as in horizontal flight.

The mixed air emerging through the pivotable control nozzles 9 are arranged at the wing ends or tips 8, in accordance with the detailed explanation appearing in my heretofore-mentioned copending United States application, Serial No. 223,986, serves to control the aircraft about its vertical axis, and indeed, by virtue of the fact that the admission to the control nozzles 9 at the ends of both of the wings 6 is of different intensity. However, they can also be employed for lateral control in that, the control nozzles 9 at both of the ends of the wings 6 are pivoted opposite to one another, for example the control nozzle 9 at the left wing is pivoted upwardly and the control nozzle at the right wing downwardly. The control nozzles 9 at both of the ends of the wings 6 can also be pivoted in the same direction downwardly or upwardly. With an approximately vertical, downwardly directed position of such nozzles and in consequence of the thus resulting vertical jet discharge, it is possible to obtain an additional lift of the aircraft. The aircraft can thereby attain characteristics of vertical or short take-off aircraft.

The brake nozzles 10 can be coupled with respect to their movement with the control nozzles 9 at each side of the aircraft, for example through suitable linkage or lever means, such that the braking jets as well as the control jets emerging from the control nozzles in the same direction serve for lateral control of the aircraft. The control of the aircraft about its vertical axis due to different admission intensity to the control nozzles 9 in their horizontal position, can take place by means of streamlined-shaped displacement bodies or the like which are pivotable into or out of the aforesaid control nozzles, respectively. Due to the swinging-in and swinging-out of these displacement bodies the free cross-sectional area of the pivotable control nozzles 9 can be changed and, therewith, the nozzles 9 at the ends of both of the wings 6 have different degrees of fluid medium admission or impingement imparted thereto. While further details of the control nozzles and their manner of operation are not necessary for understanding the principles of the present invention, specific reference may be made to my aforesaid copending application for the detailed discussion of such nozzles appearing therein.

During start, the exhaust slots 7 as well as the openings 21 for air infeed to the exhaust slots 14 are opened, in order to carry out the influence of the boundary-layer in the desired manner. After achieving a sufficient gain in altitude of the aircraft A the latter is switched-over to horizontal flight, and indeed, by virtue that the exhaust slots 7 located at the respective wings 6 are closed by upwardly pivoting the corresponding streamlined section or profile nose 19, and the openings 21 for the influx of the mixed air to the exhaust slots 14 are likewise closed by the closure means or flap 11. As a result, the closure means or flap 16 located in the passageway or channel 15 leading to the thrust nozzle 17 arrives in its open position, so that the largest portion of the mixed air coming from the mixing chamber 4 escapes through the thrust nozzle 17 and the aircraft then goes from a vertical or short take-off start into horizontal flight.

Figure 5:
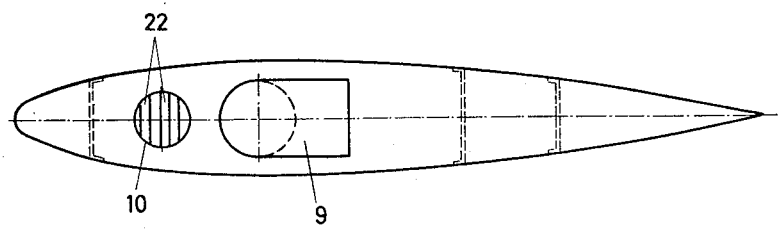
FIGURE 5 illustrates a front or end view of the wing tip of the aircraft of FIGURE 1.

The remaining portion of the mixed air serves to control the aircraft by means of the control nozzles 9 provided at the wing ends 8. In the horizontal position of these control nozzles 9, according to FIGURE 5 of the drawing, such nozzles simultaneously serve for the propulsion of the aircraft, with a vertical downwardly directed position thereof they serve to provide an additional lift increase, and in the intermediate position they serve to increase propulsion as well as also to increase lift of the aircraft in a corresponding relation, depending upon their angular position.

The brake nozzles or nozzle means 10 which are equipped with adjustable shutter-like guide surfaces 22 for deflecting the air jet can, of course, be closed through corresponding adjustment of these guide surfaces 22 or through other closure elements. They are only switched-in from case to case, for example, during a trial run of the aircraft at standstill in order to prevent a rolling away of the aircraft, and during landing in order to shorten the landing distance of the aircraft. The braking nozzles 10 can, however, also be placed in operation during flight, if necessary, for example, then when the aircraft is to be brought from its maximum speed as quickly as possible down to slow flight.

In the embodiment illustrated in the drawings, a further channel or duct 23 is operably connected to the channel or duct 15 leading to the thrust nozzle 17. This channel 23 leads to the profile nose or streamlined section of the tail unit or surface 24, and there is likewise equipped with discharge or exhaust slots, generally designated by reference numeral 26, for the discharge of the mixed air formed in the mixing chamber 4. The discharge of the mixed air at the leading wing edge of the tail surface 24 rendered possible hereby, serves to equalize the nose heavy moment of the aircraft appearing during slow flight which is caused by the deflected or lowered landing flaps during slow flight and by the displacement or shifting of the center of lift to the rear in consequence of the boundary-layer influence. It is not necessary to close the exhaust openings at the tail surface 24 during rapid flight, since then the affect of the discharge of the mixed air at the tail surface is disappearingly small.

In the illustrated embodiment of the drawing the mixed air delivered by the front fan 2 and the gas turbine 1 serves for the jet control as well as also for the jet propulsion and for the boundary-layer influence of the aircraft, whereby the quantity of air necessary for influencing the boundary-layer becomes that much smaller the more intense the admission to the thrust nozzle 17 for the propulsion of the aircraft. It will also be appreciated that a single intercommunicating conduit system is used for delivery of the gaseous or fluid medium effecting flight sustaining thrust, boundary-layer influence and directional control of the aircraft. Additional adjustable deflecting flaps, not shown in the drawing, can be provided at the thrust nozzle 17 in order to utilize the propulsive jets emanating therefrom also to increase lift, to control the aircraft about its vertical and lateral axes as well as for reversing thrust for the purpose of braking the aircraft during taxiing after landing. By virtue of the mixed air supplied to the hollow wings 6 and to the leading wing edge of the tail surface 24, icing of the critical external surfaces of the aircraft is prevented so that the provision of special apparatus for preventing the danger of icing is rendered superfluous.

While there is shown and described a present preferred embodiment of the invention, it is to be distinctly understood that the invention is not limited thereto but may be otherwise variously embodied and practised within the scope of the following claims.

Having thus described the present invention, what is desired to be secured by United States Letters Patents, is:

1. In a system for controlling aircraft according to the reaction principle including control nozzles providing combined control and propulsive jets disposed on the aircraft, said control nozzles constituting the sole control means for directionally controlling the aircraft about its three axes, means for supplying a gaseous medium to said control nozzles, means operatively communicating with said supplying means for influencing the boundary-layer by discharging at least a portion of said gaseous medium at a lifting surface of the aircraft, said gaseous medium supplying means and said boundary-layer influencing means incorporating a single intercommunicating conduit system.

2. In a system for controlling aircraft according to the reaction principle including control nozzles providing combined control and propulsive jets disposed on the aircraft, means for supplying a gaseous medium to said control nozzles, said control nozzles providing the sole control means for directionally controlling the aircraft, means operatively communicating with said supplying means for influencing the boundary-layer by discharging at least a portion of the gaseous medium at a surface of the aircraft.

3. In a system for controlling winged aircraft according to the reaction principle including control nozzles providing combined control and propulsive jets disposed on the aircraft, said control nozzles providing the sole control means for directionally controlling the aircraft, means for supplying fluid medium to said control nozzles for efflux as propulsive jets therefrom, means operatively communicating with said supplying means for influencing the boundary-layer by discharging fluid medium at the wings of the aircraft.

4. The system defined in claim 3 wherein the winged aircraft includes landing flaps arranged at the wings thereof, said boundary-layer influencing means including exhaust opening means provided at the leading edge of the wings as well as in the region of the landing flaps which communicate with said supplying means for the propulsive jets.

5. The system defined in claim 4 wherein said exhaust opening means in the region of the landing flaps are situated forwardly of the latter.

6. The system defined in claim 4 wherein said supplying means for the propulsive jets of the control nozzles includes a power unit which simultaneously also serves to provide the main jet propulsion for the aircraft.

7. The system defined in claim 6 including at least one thrust nozzle having an opening operatively communicating with said power unit.

8. The system defined in claim 7 wherein means are provided for regulating the cross-section of the exhaust opening means of said boundary-layer influencing means and said opening of said thrust nozzle.

9. The system defined in claim 8 wherein said regulating means includes closure means for said opening of said thrust nozzle as well as closure means for said exhaust opening means in the region of said landing flaps, both said closure means being mounted to be commonly actuated.

10. The system defined in claim 8 wherein said regulating means for said exhaust opening means at the leading edges of the wings are defined by pivotably mounted flap-like constructed members.

11. The system defined in claim 7, said supplying means further including by-pass channel means disposed to cooperate with said power unit such that a portion of the fluid medium to be discharged for influencing the boundary-layer passes through said power unit as combustion air while another portion of such fluid medium passes as relatively cold-air through said by-pass channel means, a mixing compartment disposed at the outlet side of the power unit for mixing the fluid medium emanating from said power unit with the cold air passing through the by-pass channel means prior to feeding the thus mixed fluid medium towards said exhaust opening means and said control nozzles.

12. The system defined in claim 11 wherein said power unit includes at least one turbine.

13. The system defined in claim 11 including channel means connecting said mixing compartment with said thrust nozzle.

14. The system defined in claim 11 including braking nozzle means provided for said aircraft and communicating with said mixing compartment to receive mixed fluid medium therefrom.

15. The system defined in claim 14 wherein said control nozzles and braking nozzle means at each side of the aircraft are operably coupled to one another for executing rotational movement together in the same direction.

16. In a system for controlling winged aircraft according to the reaction principle, the combination with said winged aircraft of landing flaps arranged at the wings thereof and a tail unit, control nozzles disposed on the aircraft, means for supplying fluid medium to said control nozzles for efflux as propulsive jets therefrom, means operatively communicating with said supplying means for influencing the boundary-layer by discharging fluid medium at the wings of the aircraft, said boundary-layer influencing means including exhaust opening means provided at the leading edge of the wings as well as in the region of the landing flaps which communicate with said supplying means for the propulsive jets, said supplying means for the propulsive jets of the control nozzles including a power unit which simultaneously also serves to provide the main jet propulsion for the aircraft, at least one thrust nozzle having an opening operatively communicating with said power unit, said supplying means further including by-pass channel means disposed to cooperate with said power unit such that a portion of the fluid medium to be discharged for influencing the boundary-layer passes through said power unit as combustion air while another portion of such fluid medium passes as cold-air through said by-pass channel means, a mixing compartment disposed at the outlet side of the power unit for mixing the fluid medium emanating from said power unit with the cold-air passing through the by-pass channel means prior to feeding the thus mixed fluid medium towards said exhaust opening means and said control nozzles, said boundary layer influencing means further including exhaust opening means arranged at said tail unit which communicate with said power unit of said supplying means.

17. The system defined in claim 16 including channel means connecting said exhaust opening means of said tail unit with said mixing compartment.

References Cited by the Examiner

UNITED STATES PATENTS

| | | |
|---|---|---|
| 2,585,676 | 2/52 | Poisson-Quinton. |
| 3,035,792 | 5/62 | Klapproth _____ 244—15 X |
| 3,109,609 | 11/63 | Dornier _____ 244—12 |
| 3,116,041 | 12/63 | Hoerrner _____ 244—23 |

FOREIGN PATENTS

| | | |
|---|---|---|
| 203,090 | 8/56 | Australia. |
| 968,079 | 4/50 | France. |

FERGUS S. MIDDLETON, *Primary Examiner.*